(12) United States Patent
Williams et al.

(10) Patent No.: US 8,374,906 B1
(45) Date of Patent: Feb. 12, 2013

(54) METHOD AND SYSTEM FOR GENERATING PRICING RECOMMENDATIONS

(75) Inventors: Loren Williams, Decatur, GA (US); Xingchu Liu, Austin, TX (US); Reetabrata Mookherjee, Austin, TX (US); Shi Zhong, Austin, TX (US)

(73) Assignee: Zilliant Incorporated, Austin, TX (US)

( * ) Notice: Subject to any disclaimer, the term of this patent is extended or adjusted under 35 U.S.C. 154(b) by 964 days.

(21) Appl. No.: 12/241,782

(22) Filed: Sep. 30, 2008

(51) Int. Cl.
*G06Q 99/00* (2006.01)
(52) U.S. Cl. ......... 705/7.35; 705/7.31; 705/10; 705/400
(58) Field of Classification Search .................. 705/1.1, 705/7.29, 7.31, 14.13, 400, 7.35, 10
See application file for complete search history.

(56) References Cited

U.S. PATENT DOCUMENTS

| | | | |
|---|---|---|---|
| 7,133,848 B2 * | 11/2006 | Phillips et al. ............... | 705/400 |
| 7,287,000 B2 * | 10/2007 | Boyd et al. ................. | 705/14.43 |
| 7,376,603 B1 * | 5/2008 | Mayr et al. .................... | 705/35 |
| 7,379,890 B2 * | 5/2008 | Myr et al. .................... | 705/7.35 |
| 7,680,686 B2 * | 3/2010 | Tellefsen et al. ............. | 705/7.31 |
| 7,769,628 B2 * | 8/2010 | Mathews et al. ............ | 705/7.31 |
| 7,912,748 B1 * | 3/2011 | Rosenberg et al. .......... | 705/7.35 |
| 7,996,331 B1 * | 8/2011 | Solanki et al. ............... | 705/400 |
| 2002/0123930 A1 * | 9/2002 | Boyd et al. ................... | 705/14 |
| 2006/0167784 A1 * | 7/2006 | Hoffberg ...................... | 705/37 |
| 2007/0294192 A1 * | 12/2007 | Tellefsen ..................... | 705/400 |
| 2009/0144101 A1 * | 6/2009 | Malov .......................... | 705/7 |
| 2009/0234710 A1 * | 9/2009 | Belgaied Hassine et al. .. | 705/10 |

OTHER PUBLICATIONS

Clemons, Eric K. and Weber, Bruce W., "Segmentation, Differentiation, and Flexible Pricing: Experience with Information Technology and Segment-Tailored Strategies", Fall 1994, vol. 11, Iss. 2; p. 9, 28 pages.*
Bolton, Ruth N. and Myers, Matthew B., "Price-Based Global Market Segmentation for Services", Jul. 2003, Journal of Marketing, vol. 67, 108-128.*
Eugster, Cristopher C.; Kakkar, Jatin N.; Roegner, Eric V; Bringing Discipline to Pricing, Winter 2000, McKinsey Quarterly , 133.*
Maria Aparecida Gouvea;Gerald Luciano Toledo; Lino Nogueira Rodrigues Filho; "The Prices of Mailing Services Evaluated by Companies", 2001, Marketing Intelligence & Planning; 19, 4; ProQuest Central p. 282.*

* cited by examiner

*Primary Examiner* — John Hayes
*Assistant Examiner* — Freda A Nelson
(74) *Attorney, Agent, or Firm* — Taylor Russell & Russell, P.C.

(57) ABSTRACT

To determine pricing recommendations for goods and service products in a business-to-business environment, a set of transaction data corresponding to a set of products are processed to generate a set of pricing recommendations optimized according to an objective. Furthermore, a set of product segments may be determined, transaction data may be associated with one or more of the product segments and a demand model and associated price elasticity may be formulated for one or more of the product segments based upon the transaction data associated with the segment. Using these formulated price elasticities, pricing recommendations for each product may be determined for each of a set of customers. Using an optimization process, price elasticities are used to determine price dependent entity goals for any combination of products, customers and sets of prices, using a mathematical objective function.

4 Claims, 7 Drawing Sheets

METHOD AND SYSTEM FOR GENERATING PRICING RECOMMENDATIONS

TECHNICAL FIELD

This invention relates generally to price setting in a business context and, in particular, to the field of revenue management and price optimization. Even more specifically this invention relates to the use of transaction data to generate pricing recommendations which may be tailored to various objectives.

BACKGROUND

Determining a price for a good or service is a task which almost all businesses must engage in at one point or another during their existence. In fact, in many cases, pricing is one of the most important areas for businesses to focus on in a competitive market, as pricing decisions directly affect revenue and profitability and hence business value. Pricing various goods and services, however, is not a trivial task. In pricing various goods or services it may be desirable to account for a myriad number of factors including business constraints or strategies. These factors may be interdependent or discrete, known or unknown, etc. Furthermore, in many cases these businesses may have a large number of products or product combinations; and, for these products, multiple price lists that are used to communicate price offers to different types of customers. In addition, the specific set of products that are on offer can change intensively as new products are developed and old products are obsolete. Market conditions, such as customer demand for the products, competitor offers and prices, may also change rapidly and significantly.

As can be seen, then, to set the right prices for hundreds or thousands of products for different customer types under different conditions may be a challenging task, as the factors for each of these scenarios may vary to a greater or lesser degree and may be interdependent. What is desired in many processing scenarios is a price list which may be used to communicate pricing offers to potential customers.

Thus, to set prices for these price lists businesses often employ some kind of mathematical logic or model, usually some form of parametric demand model. These types of price optimization solutions are typically based on obtaining demand or price sensitivity estimates for pricing segments by applying regression models to historical data under some assumption about the functional form of the relationship between quantity purchased and price (a demand curve). In particular, a particular shape may be assumed for a particular demand curve (for example logistic) and the curve calibrated by tailoring the parameters of the assumed model to account for the historical data using statistical techniques (for example least squares or maximum likelihood estimation). A price point at which revenue or profit is maximized can then be determined using this calibrated curve.

These types of solutions are based on, and motivated by, microeconomic theory describing the behavior of consumers in a market and other assumptions. Such an approach may be useful if the sales process which gives rise to the historical transactions conforms to the assumptions of the statistical techniques, however, these methodologies are not without their problems.

More specifically, in certain contexts such as a business to business pricing environment, transactions are complex. These transactions frequently involve multiple units of individual products, negotiations may characterize the price setting, product cycles are short and market conditions are volatile. Thus, the estimated parameters and assumptions of pricing models are often found to be incomplete, inaccurate or unreliable.

Furthermore, price offers are rarely determined independently of the outcome, purchase quantities on a specific transaction are rarely decided in response to the price offer, and reliable information on rejected offers ("losses") is rarely available. In these cases then it is difficult to generate price recommendations using such price sensitivity estimates from regression models.

Additionally, many of the mathematical models used to calculate pricing recommendations may require assumptions which may be difficult to determine or estimate, such as market boundaries, sizes of market, etc. Many of these assumptions do not adhere in real world scenarios. Consequently, these flawed assumptions may reduce the accuracies of the price model and hence the determination of a revenue or profit maximizing price point. While certain more complex mathematical models may be utilized to calibrate a parametric demand model or determine price points with more or less pricing information, these solutions do not altogether ameliorate the deficiencies of many of these prior art price determination systems or methods.

As a result of these limitations and deficiencies, in many cases not only are these types prior art solutions inadequate, but in addition they may require a substantial amount of customization for a particular scenario and human intervention during the implementation of the process.

The use of human judgments is, however, also problematic. As determining price lists may be quite complex, human involvement increases the possibilities of errors and omissions and increases the time required to determine price values and update lists which, in turn, causes infrequent updates. Human judgment may also be unreliable in effectively determining which price values support particular strategies or objectives and may entail a reliance on specialists to perform the analysis.

Accordingly, improved systems and methods for determining pricing recommendations, which may be used in a price list or for other purposes, are desired.

SUMMARY

Systems and methods for generating pricing recommendations are disclosed. Specifically, embodiments of the present invention utilize a set of transaction data corresponding to a set of products to generate a set of pricing recommendations for those products where the pricing recommendation may be optimized according to an objective. More particularly, embodiments of the present invention may determine a set of segments, associate transaction data with one or more of the segments and formulate a demand model and an associated price elasticity for one or more of the segments based upon the transaction data associated with the segment. Using these price elasticities, pricing recommendations for each product may be determined for each of a set of customers and presented to a user.

In one embodiment, a demand model maybe created for one or more segments based on the transaction data associated with the segment and an optimization problem formulated based on the demand models. The optimization problem may be solved and the solution to this optimization problem used to determine the pricing recommendations.

In particular, embodiments employ unique features with respect to creating demand models to provide certain advantages. First, empirical hierarchical (for example, Bayesian) shrinkage methods may be applied to the demand parameter estimation, a unique application of this method. Second, a feature of the empirical shrinkage method may be applied in a novel way to characterize the reliability of the demand parameter estimates.

Other features of embodiments of the present may be provided during optimization. More particularly, in one embodiment, an objective function used in the optimization employs a technique of linearizing the demand function around the current price, which ensures that the optimal price values are bound around the current price. (In previous solutions, the objective function has no connection to the current price, often resulting in solution values that deviate significantly and unreasonably from the current price.)

Aspects and embodiments of the invention may provide the technical advantage of generating price recommendations with fewer, and less stringent, assumptions about underlying demand and other conditions. Embodiments of the present invention may be specifically tailored to address the conditions affecting pricing decisions in business to business commerce, including the prevalence of price negotiation, the presence of multiple units of a product on a single transaction and the bundling of products together in a single transaction.

Embodiments of the present invention may also produce recommendations in a form digestible by both the business people who own the decision, and by operational Enterprise Resource Planning (ERP) systems or the like so that the decisions or recommendations can be implemented in a substantially automated fashion. Thus, embodiments of the present invention may be utilized by business users to get a substantially complete and comprehensible view of the decisions they should make while producing substantially the smallest set of recommendations desired, increasing efficiency in executing the recommendations in an operational system, and for end-user comprehension of the recommendations. Furthermore embodiments of the present invention may also accommodate a wide array of problems without building a custom solution and may operate substantially without human intervention.

Embodiments of the present invention may be used to obtain price recommendations when transaction data is the result of negotiation and no information on rejected offers is available. Furthermore, embodiments of the present invention may be utilized without certain assumptions (for example, that the quantity purchased on a single transaction is modulated by the price on that transaction) and can produce reliable price recommendations, based on optimizing either profit or revenue, with scarce historical pricing data. As a result, embodiments of the present invention produce better and more reliable price recommendations.

Embodiments may also provide an improved means to exploit information, latent in the transaction history, about differences in market conditions across products and customers, so that a business can set and adjust prices in a manner that will effectively support management's business objectives and policies. The result of this capability is enhanced business performance (for example, increased profits) over other solutions.

Using embodiments of the present invention, the time period required to perform the analysis to determine what price values ought to be changed may also be greatly decreased, taking a matter of hours or less; whereas previous solutions either (a) required many days of analysis; or (b) relied on crude, high level adjustments. The result of this capability is enhanced business performance for firms whose product offerings and market conditions change frequently.

Additionally, certain embodiments provide a means to perform the analysis to determine product and customer type price values to be changed across the entire catalog of products and customer types; whereas previous solutions either (a) considered only a subset of the businesses' products or customer types; or (b) relied on crude, high level adjustments. The result of this capability is enhanced business performance for firms whose product offerings are extensive or who maintain prices lists for many different types of customers.

Embodiments also provide a means to perform 'what-if' or scenario analysis of the probable impacts of any set of price recommendations. In previous solutions such analysis could only be performed (a) using separately developed and maintained assumptions about market response to price changes; (b) considering only a subset of the firm's products or customer types; or (c) require many days of analysis. The result of this capability is enhanced business performance (for example, increased profits) stemming from the ability to evaluate accurately many alternative pricing plans.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
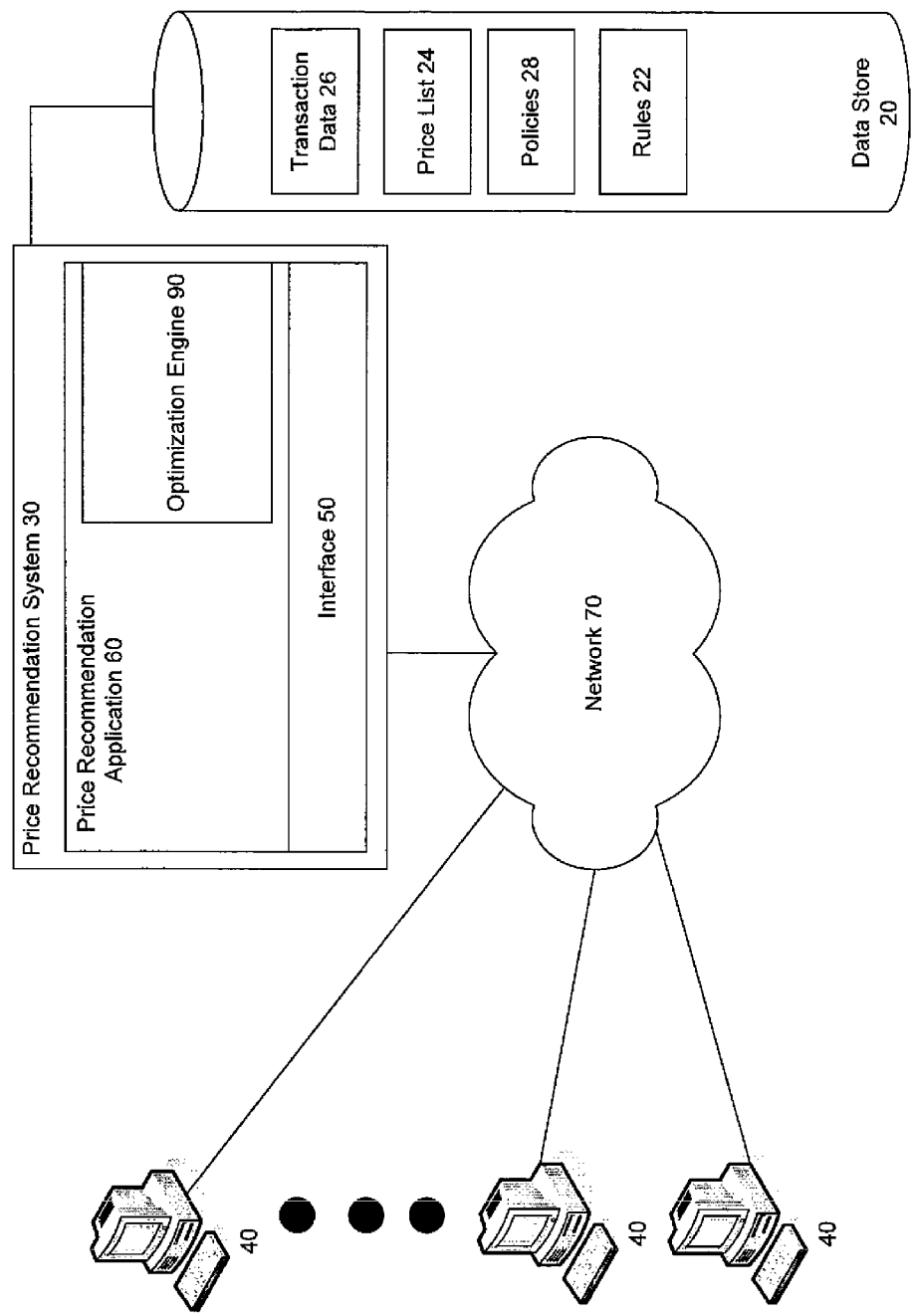
FIG. 1 is a block diagram for one embodiment of a pricing recommendation system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions or rearrangements within the spirit or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing embodiments of the present invention it may be helpful to review other methodologies for determining pricing recommendations and associated functionality such as those disclosed in U.S. patent application Ser. No. 11/604,504 entitled "Method and System for Price Optimization" by Harun Ahmet Kuyumcu et al. filed on Nov. 27, 2006, U.S. patent application Ser. No. 11/825,957 entitled "Method and System for Refining Pricing Recommendations" by Scott Royston et al. filed Jul. 10, 2007, U.S. patent application Ser. No. 11/827,033 entitled "Method and System for Generating Pricing Recommendations" by Scott Royston et al. filed Jul. 10, 2007, and U.S. patent application Ser. No. 12/057,027 entitled "Method and System for Formulating a Mixed Integer Program for Generating Pricing Recommendations" by Scott Royston et al. filed Mar. 27, 2008 which are all hereby incorporated herein in their entirety.

Attention is now directed to systems and methods for generating pricing recommendations. Specifically, embodiments of the present invention utilize a set of transaction data corresponding to a set of products to generate a set of pricing recommendations optimized according to an objective. More particularly, embodiments of the present invention may determine a set of segments, associate transaction data with one or more of the segments and formulate a model and associated price elasticity for one or more of the resulting segments based upon the transaction data associated with the segment. Given an objective, these price elasticities may be used to determine pricing recommendations for the given objective corresponding to each product and each segment may be determined and presented to a user.

In may be helpful here to give some context by providing one application of embodiments of the present. In particular, businesses engaged in business to business (B2B) commerce need to establish and maintain price lists that are used to communicate offer prices to potential customers. Price lists, as are known in the art, comprise a listing of products and one or more prices corresponding to these products. A wide variety of factors may bear on the number and value of prices corresponding to a particular product including quantity of product purchased, type of customer doing the purchasing, etc.

As can be imagined, businesses are desirous of setting and maintaining the prices on these lists such that the prices will effectively support management strategies or objectives, such as maximizing the expected profit or revenue that could be earned, achieving certain product volumes, etc. Firms engaged in B2B commerce, however, frequently have a very large number of products or product combinations and, for these products, multiple price lists that are used to communicate price offers to different types of customers. In addition, the specific set of products that are on offer and associated market conditions can change intensively, as new products are developed, old products obsoleted, customer demand fluctuates, etc. Hence the problem of setting and maintaining prices on such price lists so that they support management objectives is a complex problem. Embodiments of the present invention may be usefully applied in such contexts, among others, to recommend prices which effectively meet desired management objectives. Certain of these embodiments may be usefully employed by businesses to generate pricing lists to set and adjust price values in their pricing lists to support the objectives of the businesses management.

Referring first to FIG. 1, a pricing recommendations system in accordance with one embodiment of the present invention is depicted. Price recommendation system 30 may include a data store 20 and, using interface 50, accept and respond to commands or queries from one or more operators at computing devices 40 coupled to price recommendation system through network 70 to provide pricing recommendations to these operators.

To illustrate in more detail, pricing recommendation system 30 may be executing pricing recommendation application 60 (for example, one or more computer executable instructions). An operator at computing device 40 affiliated with a business (not shown) may provide as input to the pricing recommendation system 30, an initial price list comprising a set of products offered for sale by the business and one or more corresponding current prices for each of those products. Additionally, an operator may provide a set of transaction data comprising data corresponding to sales of these products to the pricing recommendation application 60. The transaction data or price list may be provided by allowing pricing recommendation application 60 access to a data store associated with the business (for example, maintained by an enterprise resource planning (ERP) system used by the business, etc.) The provided price list 24 and transaction data 26 may be stored in data store 20 allow access to this data during subsequent processing.

Using interface 50, which may be a graphical user interface, a web interface or any other type of interface, operator may also indicate one or more objectives which a business desires to achieve, such as maximizing revenue, maximizing profit, maximizing market share, maximizing volume, etc.; one or more business policies 28 (such as prices should be increased, etc.) and one or more business rules 20 (which may define how prices relate to one another). Using optimization engine 90, pricing recommendation application 60 may process the transaction data 26, business policies 28 and business rules 22 to determine a set of substantially optimal pricing recommendations configured to accomplish the objectives given the policies 28 and rules 22 which the business wishes to implement.

These pricing recommendations may be communicated to the operator as absolute prices, as price changes relative to the prices on the initial price list or in some other manner. Additionally, an operator may be presented with one or more impact metrics, where each of the impact metrics corresponds to a prediction of a business outcome based upon an implementation of one or more of the recommended prices. These predictions may correspond to expected revenue, profit, volume over a time period, etc. and provided to operator using interface 50.

Figure 2:
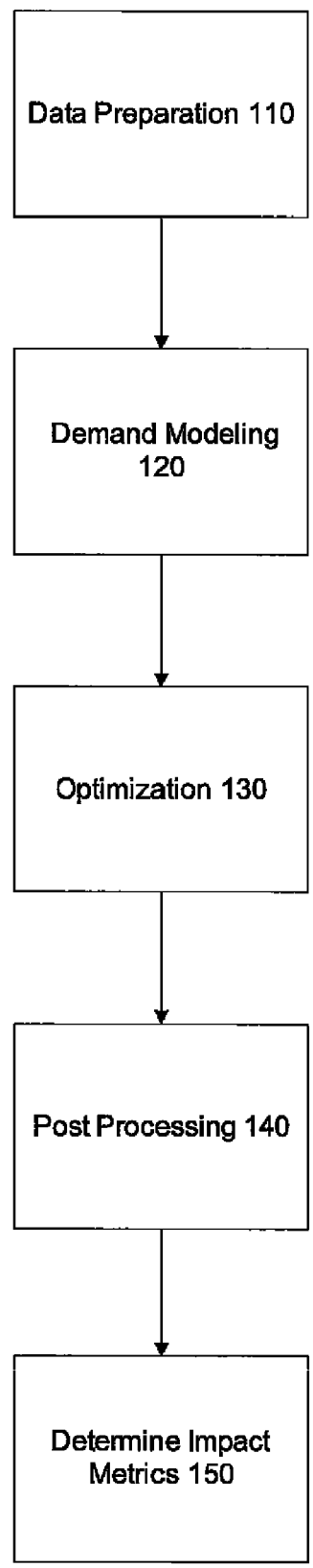
FIG. 2 is a flow diagram of one embodiment of a method for generating pricing recommendations.

Embodiments of the present invention will be better understood with reference to FIG. 2 which depicts a flow diagram for one embodiment of a method for generating pricing recommendations, which may be, for example, employed by an embodiment of a pricing recommendation application. The results of these computations may be presented to a user as a matrix of products, customers segments and corresponding prices or price changes to implement.

Initially, a set of transaction data pertaining to the sale of one or more products may be obtained. This transaction data may include, for example, invoice data, a set of price points at which a particular product or service was sold (sometimes referred to as a "win") or a set of price points at which a particular good or service was offered but not sold (sometimes referred to as a "loss"). At step 110 this transaction data may be prepared, including assembling, organization and filtering (for example, outlier transactions identified and removed) of the transaction data. In one embodiment, prices on each particular transaction are expressed in a normalized form (for example, ratio to list price, markup over cost, etc.). This normalized price is referred to below as the decision variable (DV), as it may be the variable which is chosen by the optimization as providing the optimal solution. Additionally, a price list corresponding to a list of products and one or more prices for those products may also be obtained.

Demand models may then be created using the prepared transaction data at step 120 in order to obtain a set of elasticities corresponding to each of the products and one or more corresponding segments. In one embodiment, this demand modeling may entail the determination of demand model parameters (for example, parameters of a specific demand model) corresponding to products or product segments utilizing data corresponding to those products across all customers. Similarly, demand model parameters corresponding to customers or customer segments may also be determined utilizing data corresponding to those customers across all products. From those demand models, demand model parameters corresponding to combinations of customers and products may also be created. These demand model parameters may be converted into price elasticities which model the relationship between a price value and the probability of purchase or sales quantity. The determined price elasticities may be subsequently evaluated for reliability.

At step 130, then, during an optimization process price elasticities deemed reliable are used to determine the expected sales volume, revenue or profit for a product/customer combination, for any set of price values that could be chosen given a mathematical objective function. In one embodiment, the objective function(s) are formulated as a non-linear mathematical program (NLP), subject to business policies that act as constraints or side goals in the NLP, which may, in one embodiment, be formulated as a mixed integer program (MIP). The NLP can be solved using a mathematical programming solution engine, and the solution is expressed as a substantially optimal set of price values which may take into account the businesses policies.

In post-processing at step 140 substantially optimal price values determined for each product/customer combination with a reliable demand elasticity may be subjected to further adjustment in accordance with business rules (which may not have been accounted for during the optimization process at step 130) and the product/customer combinations for which reliable demand model parameters could not be determined (for example at step 120) may have price values set. These price values for these product/customer combinations may be determined based upon other previously determined price values (for other product/customer combinations) or according to business rules that relate to attributes of a product or a customer segment to specific price values or changes in existing price values.

Predicted impacts can then be determined at step 150. More specifically, in one embodiment, a user-selected set of transaction data, the final price values recommended for each product in each segment and the current price values for each product in each segment are used to compute the magnitude of each price change being recommended. Then, using the parameterized, linearized demand model used in optimization step 130, the expected sales volume, revenue and profit may be computed for each transaction in the user-selected set of transaction data.

Figure 3:
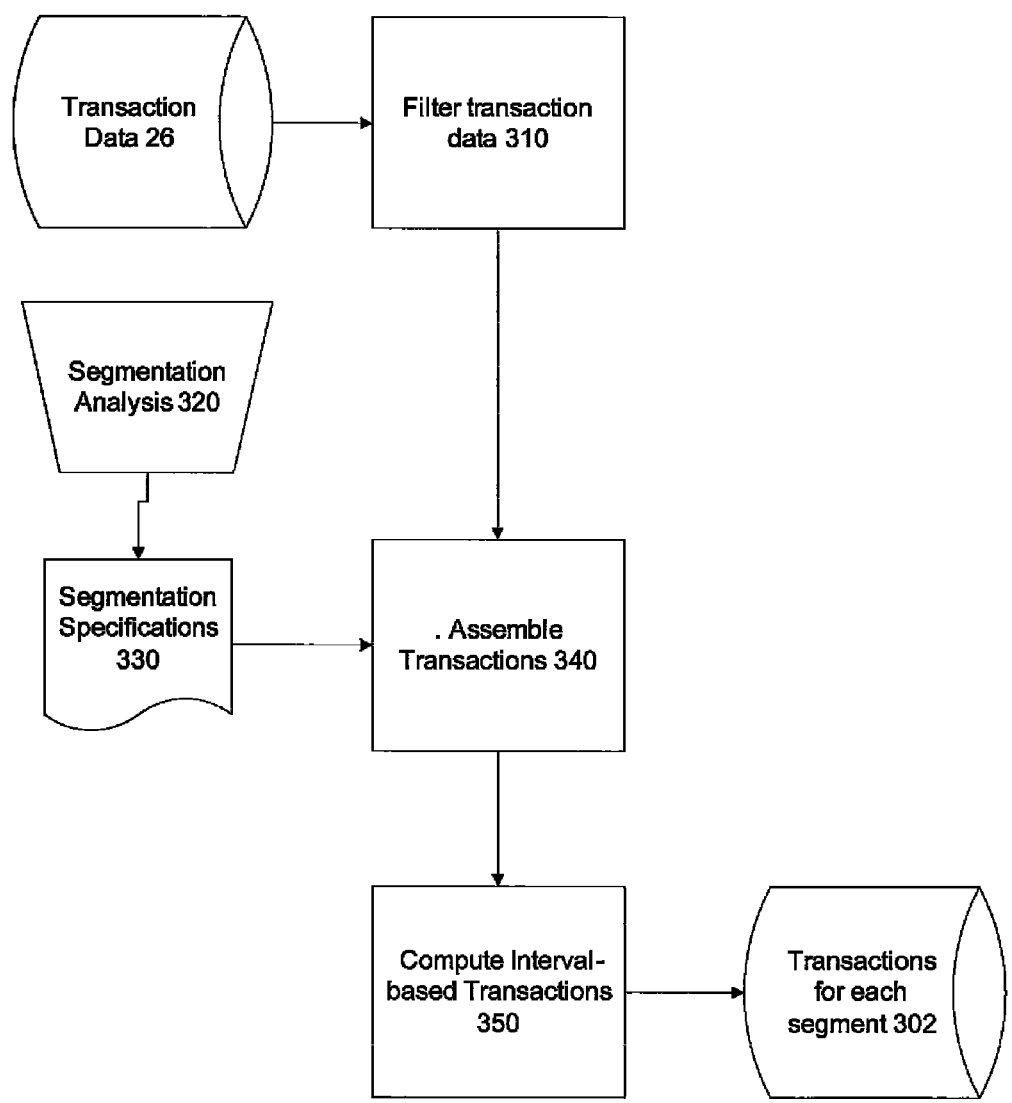
FIG. 3 is a flow diagram of one embodiment of a method for preparing data.

Moving now to FIG. 3, one embodiment of a method for preparing data is depicted. In this embodiment, transaction data 26 may be segmented according to a segment specification to obtain a set of segments where each transaction of the transaction data may be associated with at least one of the segments 302. More specifically, at step 310 transaction data may be filtered. This transaction data may comprise data pertaining to the sale or offer for sale of a product to a customer and may thus comprise data on the sale price, quantity sold, offered or ordered, quantity shipped, unit price, total price, size of customer, family, product line or type of product or other product information such as stock-keeping unit (SKU) number or universal product code (UPC) number, cost, markup, average cost per unit sold, a product group of the product, dimensions of the product, color of the product, customer name, customer number/identifier, region in which the customer resides, customer size, quantity sold, final price at which product sold, cost of product at time of transaction, competitor price at time of transaction, industry average price at time of transaction or any other type of information a business desires to keep with respect to its transactions. Transaction data, product information and customer information may be provided in different files. In this case, at step 310 each of the transactions may be associated with a corresponding product in the associated product file and with a corresponding customer in the associated customer file.

In one embodiment, a filtering process may entail removing or disregarding transactions with, for example: negative net sales, cost of $0.01 or less, a unit price of $0.01 or less, missing or blank SKU number, a non-positive quantity ordered, a non-positive quantity shipped or any other out-of-scope transaction. What comprises an out-of-scope transaction may be defined by an operator or be set by defining one or more parameters. Outlying transaction may be removed, where an outlying transaction is a transaction that meets a particular criteria defined by such a parameter, for example in the top 0.25% and bottom 0.25% of transaction based on overall markup/margin distribution.

At step 320 then, a segmentation analysis may be performed to generate one or more segmentation specifications 330. This segmentation analysis may be performed offline, through consultation with a business or through a statistical processing of transaction data. In segmentation analysis a determination of the similarity of products may be determined to create a product segment specification. The creation of a customer segment specification may be based upon similarities between one or more customers of the business. Transactions can then be assembled according to each of the segment specifications at step 340. In one embodiment, each transaction of the transaction data may be associated with one or more segments in the product segment specification and one or more segments in the customer segment specification.

Segmentation analysis may involve the determination of a set of hierarchically ordered attributes and attribute ranges where by segmenting the transaction data according to the values for these attributes, the transaction data may be binned according to those segments. These attributes may be determined offline through a consultation with a business or through analysis of the transaction data. As the set of segments may be defined by a set of ordered or hierarchically arranged attributes, the attributes themselves separated into as a set of value ranges, the set of defined segments may be thought of conceptually as a tree structure, with each segment as a node in the tree. To give an example, the attribute of cost may be associated with four buckets: a low cost bucket where the cost is less than $100, a mid cost bucket where the cost is $100 or more but less than $1000, a high cost bucket where the cost is $1000 or more but less than $10000, and a highest cost bucket where the cost is more than $10000.

Thus, each attribute may correspond to a level of the tree. For example, suppose that a product segmentation specification comprises four attributes, ordered respectively, category, sub_category, cost_bucket and product. Here, category may correspond to a first level of the tree, sub_category corresponds to the second level, cost_bucket the third level and product the fourth level of the tree.

Segmentation analysis at step 320 to generate segment specifications 330 (for example, product segment specification and customer segment specifications) may entail analysis of the transaction data and obtaining from a business how valuable certain types of customers are to the business or the cost to serve a particular customer, etc. Thus, segmentation analysis at step 320 may entail binning transaction data by the attribute of average cost using context-sensitive classification and regression trees (CART). In one embodiment, each product sub_category attribute is divided into up to four bins where each bin has at least ten transactions or 2% of the total transactions in the sub_category (maximum of the two) and minimum of five distinct markups.

Thus, once segment specifications have been determined and transaction data associated with each of the segments, transaction data may be further refined. In one embodiment, outlier transactions within each segment may be removed (for example, for more robust demand model estimation). Specifically, in one instance the top 0.5% and bottom 0.5% of transactions in a segment-specific distribution based on a markup for the transactions are removed along with the transactions in each segment with a markup outside 99% confidence interval ($\mu-2.5\sigma$, $\mu+2.5\sigma$), where $\mu$ and $\sigma$ are the mean and standard deviation of markup in that segment.

Following the refinement of transaction data in each segment, decision variable (DV) binning may be utilized to bin the transactions associated with each segment to produce a set of transactions binned according to DVs associated with each segment. In one embodiment, prices corresponding to transactions may be binned by rounding them to the $3^{rd}$ decimal point. For example, a markup within [1.0555, 1.0565) is rounded to 1.056. Additionally, the time duration of any observed price may be normalized (for example, to one week): if one price was observed in multiple weeks, each week shows up as a separate point on the observed demand curve and carries a weight that decreases with time. The weight formula used may be $$\exp\left(\frac{\text{week index} - \text{max\_week\_index}}{\alpha}\right),$$

where week_index starts from 1 for the first (for example, least recent) week of history. The parameter $\alpha$ may be selected by offline analysis or analysis of transaction data corresponding to one or more segments or other data.

Using the set of segments and the associated transaction data 302 and any weighting parameters 502 provided by a user, demand elasticities may be calculated using demand modeling. The weighting parameters may allow a user to weight the importance a particular transaction in calculating a price based on the time of occurrence of a transaction. These weighting parameters may be utilized as a weight in weighted regression as will be discussed later.

Figure 4:
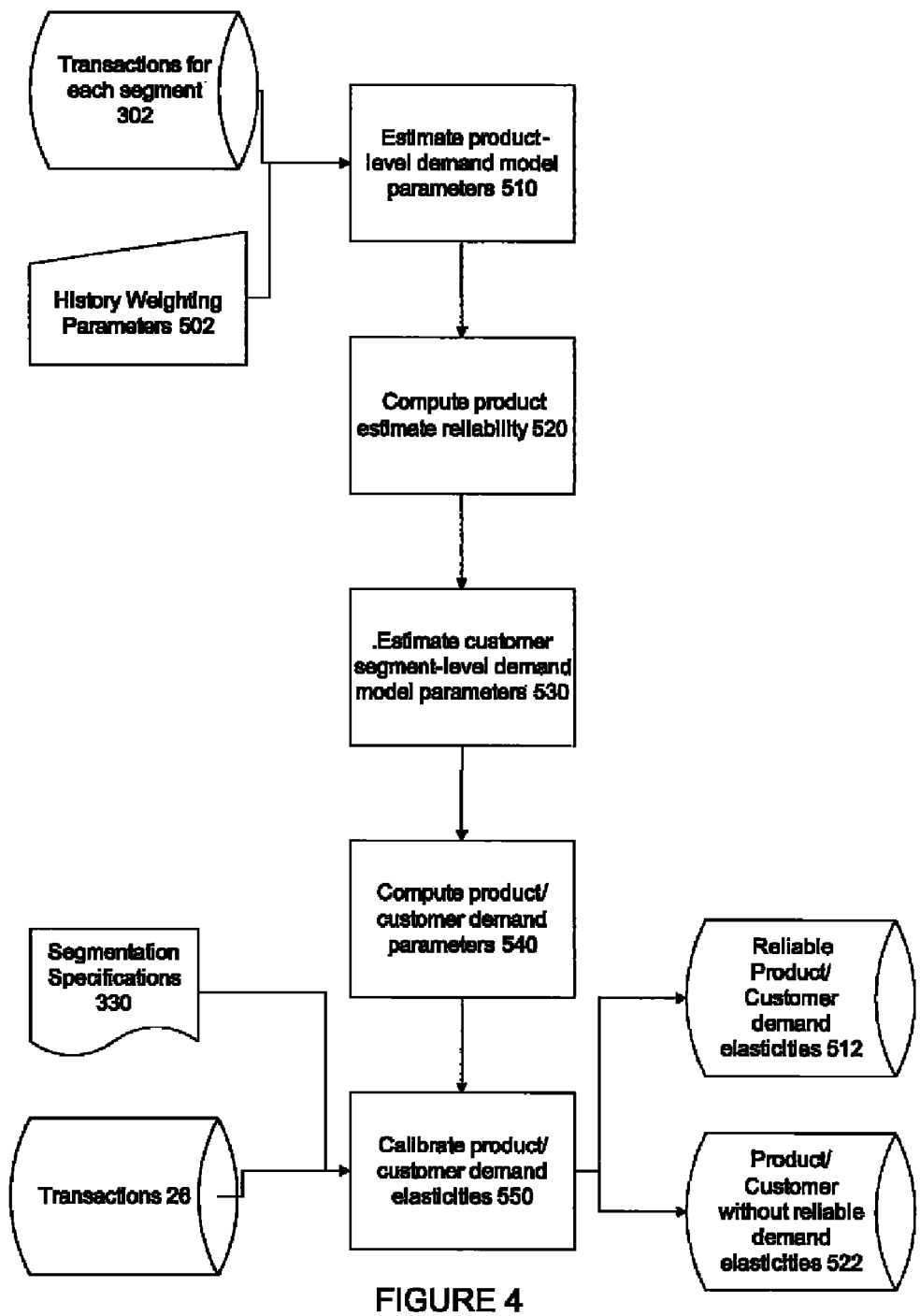
FIG. 4 is a flow diagram of one embodiment of a method for determining elasticities.

FIG. 4 depicts one embodiment of a method for determining demand elasticities using demand models. First, at step 510 demand models may be estimated for product segments. Here, these demand models may reflect demand for that product segment regardless of to whom those products are being sold. This may entail fitting a parametric demand model (for every $\log(q)=b_0+b_1 \cdot m$, where $m=p/c$ is markup) for every segment in the product segment hierarchy whenever there are enough number of distinct DV values (the threshold is determined by offline analysis) using weighted linear regression algorithms. The estimated slope parameter can be converted into an elasticity (for example, the elasticity model corresponding to the semi-log demand model example above is $\epsilon=b_1 \cdot m$). Thus, the transaction data may used to calculate the elasticities for product segments that will be subsequently used in optimization.

Reliability measurements may then be calculated for the determined demand models and shrinkage applied based upon the estimated demand model parameters. This step may entail the calculation of a reliability measure (w) for each demand model based on metrics for the corresponding segment: the R-squared statistic from the regression, the range of DV values, the number of distinct DV values (n_dvs), and the standard deviation ($\sigma$) of the DV distribution. These metrics are used to compute weights at each level of the product segment hierarchy, based on the quality of the model for a given product segment, relative to models for other product segments at the same level in the product segment hierarchy each weight calculation, there may be a percentile threshold used to separate reliable from unreliable models where these thresholds may be established by offline analysis or by some other method. This reliability measure is used to weight models at different levels of the hierarchy for hierarchical shrinkage.

For example, at each level, the weight may be computed as a product of the following three weights:
Weight Based on R-Square $$w(R^2) = \begin{cases} 1 & \text{if } R^2 \geq R^2_{75\%} \\ \exp\left[-\left(\frac{R^2-R^2_{75\%}}{\frac{R^2_{75\%}}{3}}\right)^1\right] & \text{otherwise} \end{cases},$$

where $R^2_{75\%}$ is $75^{th}$ percentile from the distribution of all model's $R^2$ numbers;
Weight based on DV standard deviation $$w(\sigma_{dv}) = \begin{cases} 1 & \text{if } \sigma_{dv} \geq \sigma_{dv}(35\%) \\ \exp\left[-\left(\frac{\sigma_{dv}-\sigma_{dv}(35\%)}{stdev(\sigma_{dv})}\right)^1\right] & \text{otherwise} \end{cases},$$

where $\sigma_{dv}(35\%)$ is the $35^{th}$ percentile from all segments for which we have models; and
Weight based on number DVs per unit range (u=n_dvs/(max_dv-min_dv))

$$w(u) = \begin{cases} 1 & \text{if } u \geq u_{35\%} \\ \exp\left[-\left(\frac{u-u_{35\%}}{u_{35\%}}\right)^1\right] & \text{otherwise} \end{cases},$$

where $u_{35\%}$ is $35^{th}$ percentile from all segments for which there are models.

In one embodiment, the final weight is $w=w(R^2) \cdot w(\sigma_{dv}) \cdot w(u)$ and can be expressed as a number between 0 and 1. It will be apparent, here, that these weighting expression are exemplary only and any number of different weighting expressions could be utilized as desired. Next for each segment at the product level of the product segmentation hierarchy, apply hierarchical shrinkage (which may be Bayesian) to shrink its slope ($b_1$) towards its parents and ancestors' parameter values. For example, let category be level 1, sub_category be level 2, cost_bucket be level 3, and product be level 4. The shrinkage result for a given product is $$\frac{b_1^{(4)} \cdot w^{(4)} + b_1^{(3)} \cdot w^{(3)} \cdot 0.5 + b_1^{(2)} \cdot w^{(2)} \cdot 0.2 + b_1^{(1)} \cdot w^{(1)} \cdot 0.1}{w^{(4)} + w^{(3)} \cdot 0.5 + w^{(2)} \cdot 0.2 + w^{(1)} \cdot 0.1}$$

where $w^{(i)}$ is the reliability measure of the corresponding model at level i. The exemplary factors (1, 0.5, 0.2, 0.1) shown in the expression above reflect the importance of each level for calculating the final slope for a given product. The rationale underlying this is that if there exists a good estimate at every level, it may be desired to bias the average towards the product-level estimate; if there exists an estimate only at the category level, the factor 0.1 may not matter since it will be normalized out. If a demand model at any level does not exist or the slope is positive, the corresponding w is set to 0.

At step 520, for each product, a single binary reliability flag may be calculated based on the weights at all levels ($w^{(4)}$, $w^{(3)}$, $w^{(2)}$, $w^{(1)}$). The logic for determining this flag may be established by offline analysis and may comprise a set of reliability thresholds corresponding to values for calculated weights. For example:
a. If $w^{(4)} \geq 0.7$, then the estimate for the product is reliable;
b. If $w^{(3)} \geq 0.5$, then the estimate for the product is reliable;
c. If $w^{(2)} \geq 0.5$, then the estimate for the product is reliable;
d. If $w^{(1)} \geq 0.5$, then the estimate for the product is reliable;
e. Otherwise, the estimate is not reliable for the product.

It will be apparent that these reliability thresholds are exemplary only and the particular reliability thresholds utilized may be dependent on a variety of factors, including the number of levels in a segmentation hierarchy, quality of desired results, etc.

Once a product is identified to have unreliable elasticity/slope estimate, the price recommendations for that product can be generated through a post-processing logic based on product-level metrics (as discussed later). After the reliability is estimated and shrinkage applied, demand model parameters may be estimated for each customer segment at step 530. Here, these demand models' parameters may reflect demand for that customer segment regardless of which product(s) are being bought by that customer segment. In one embodiment, demand model parameters for every customer segment are determined, using transactions for all products sold in that segment. This may be accomplished, for example, using a similar shrinkage method as that described above with respect to Step 510.

These demand model parameters may also be determined by computing the model slope ($b_1$) for every customer segment and a global slope for all customer segments combined, then computing a smoothed slope ($b_1$) by combining each customer segment slope with the global slope where the combination weight depends on the R of the regression model for the segment.

The demand models' parameters for the customer segments and the previously determined demand model parameters for the product segments may be used to determine demand model parameters for product/customer segments at step 540. Here, the product-level demand model parameters and the customer segment-level demand model parameters are combined to product product/customer segment-level demand model parameters. In one embodiment, the product-level demand model parameters and customer segment-level demand model parameters are combined as follows: for a given product, use that product's historical revenue distribution (e.g., over the last six months) across different customer segments to compute $\bar{b}$, a revenue-weighted average of each customer segment's slope parameter. Then, for that given product, compute an offset for each customer segment as the customer segment's slope parameter divided by $\bar{b}$, compute the product/customer segment-level slope as the product-level slope parameter multiplied by the offset for each customer segment where, for that product, the final product/customer segment level elasticity is calculated at the current price (for example, obtained from the intial price list).

The demand model parameters may then be calibrated at step 550. Specifically, in one embodiment demand elasticities may be calibrated to reflect, in the aggregate, recent history. This calibration may be done at a desired level in the product segmentation hierarchy (for example, category) using time-wise (e.g. weekly) aggregations of prices, sales and revenue seen over a historical horizon. Next, the weekly revenue-weighted average elasticities for each desired level in the product segmentation hierarchy (for example, category) may be calculated separately for average price increases and average price decreases, without reliance on any parametric model (i.e. non-parametric). These weekly non-parametric elasticities are smoothed (e.g. by computing the median value). The smoothed, aggregate non-parametric elasticities can then be compared with the aggregate of the elasticity estimates from step 540 to obtain a linear calibration factor s for each category: $\beta_{scaled} = s \cdot \beta$, such that $\beta_{scaled}$ is substantially equal to the smoothed aggregate non-parametric elasticities. This calibration factor can applied to all product/customer segments having corresponding elasticities which exceed the reliability threshold (as discussed above) to obtain the final elasticities for those product/customer segments.

After this calibration process a set of reliable elasticities and one or more corresponding product/customer segments 512 along with one or more product/customer segments which do not have corresponding reliable demand elasticity measurements 522 may be determined. Using the set of reliable elasticities corresponding to one or more product/customer segments, corresponding substantially optimal prices for these segments may be calculated. These substantially optimal prices, may, in one embodiment, be expressed as a margin for each product and corresponding segment.

Figure 5:
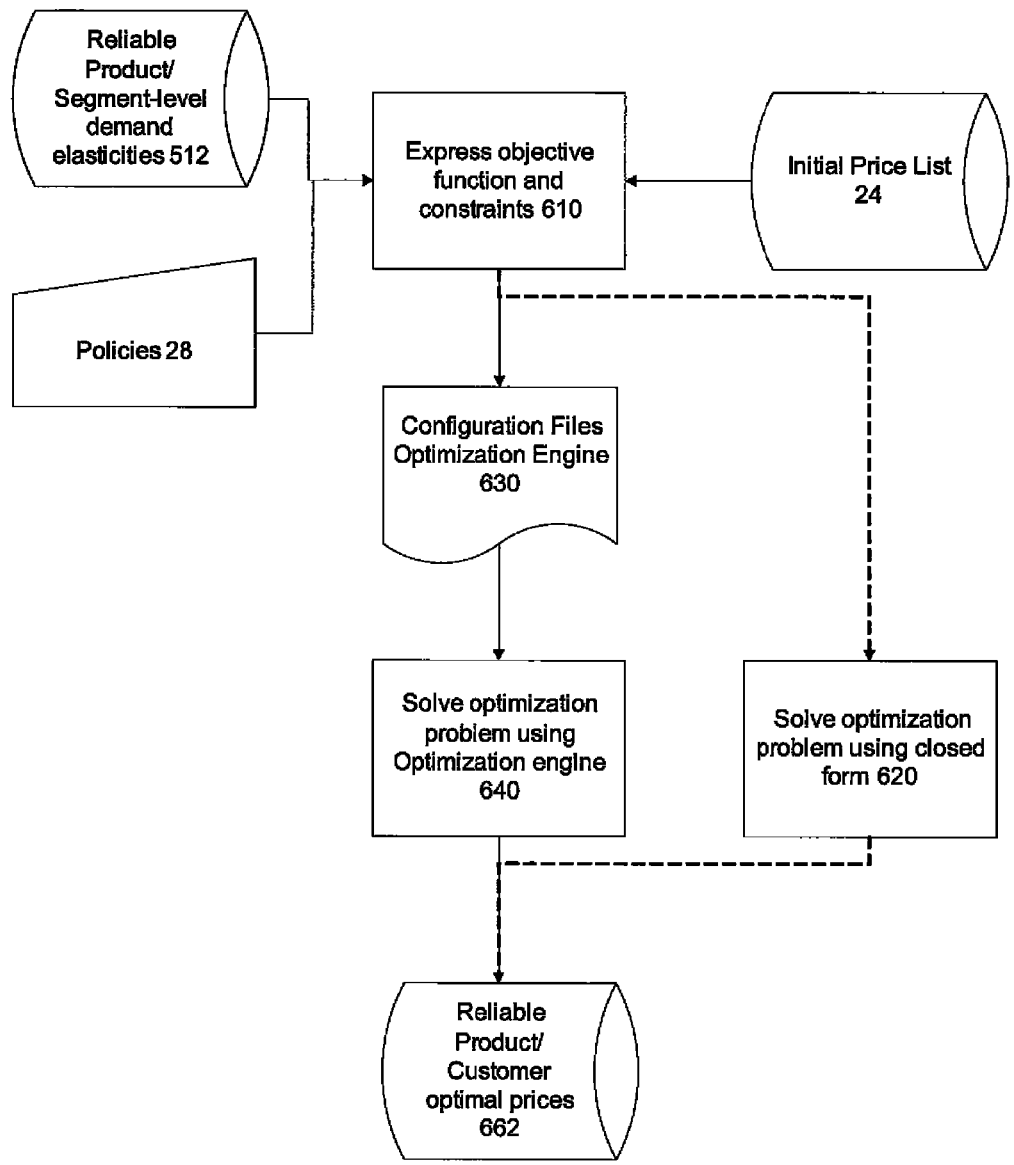
FIG. 5 is a flow diagram of one embodiment of a method for optimization.

FIG. 5 depicts one embodiment of such an optimization method. Using the set of reliable elasticities 512, where each reliable elasticity corresponds to a product/customer segment, a set of business policies 28 to which it is desired to adhere and the list of current prices 24 corresponding to each product/customer segment and the desired objective at step 610, an objective function which mathematically expresses both the desired objective and the business policies may be determined. This determination may include the parametizing of business policies 28 using the elasticity corresponding to a product/customer segment.

In one embodiment, using the calibrated elasticity corresponding to a product/customer segment, the demand model for the segment may be linearized around the current price (for example, as determined from the initial price list 24) associated with that product/customer segment:

$$q = \max\left(1 + \beta \cdot \left(\frac{p_{curr} - p}{p_{curr}}\right), 0\right) \cdot q_{curr},$$

where q is the quantity, β is the elasticity value at the current price ($p_{curr}$) (for example, from the initial price list 24) and p is the price which is trying to be determined. By using this function, the elasticity of the product/customer segment is tied to the current price, such that any determination of substantially optimal pricing may be made relative to the current price. It will be apparent that other demand model functions may be utilized. For example, the optimal margin for maximizing expected gross profit is given by:

$$m^* = \frac{m_a + \frac{1}{\beta}}{2 + \frac{1}{\beta} - m_a},$$

where $m_a$ is the "anchoring" margin implied by the current price and cost, the solution for maximizing revenue is:

$$m_1^* = 1 - \frac{1\beta}{1+\beta}(1 - m_a),$$

Depending on the user input the objective of the optimization may be
1) revenue lift, calculated at each product/customer segment as:

$$r_{lift} = \frac{q^* p^*}{q_a p_a} = \left(1 - \beta \cdot \frac{m^* - m_a}{1 - m^*}\right) \cdot \left(\frac{1 - m_a}{1 - m^*}\right)$$

2) expected gross profit lift, calculated at each product/customer segment as:

$$g_{lift} = \frac{q^*(p^* - c)}{q_a(p_a - c)} = \left(1 - \beta \cdot \frac{m^* - m_a}{1 - m^*}\right) \cdot \left(\frac{m^*(1 - m_a)}{m_a(1 - m^*)}\right)$$

where (q*, p*) are the volume and price at the optimal margin and ($q_a$,$p_a$) the volume and price at the anchoring margin.

It will be apparent that other optimization functions may be utilized for these objectives and that these objectives are exemplary only and other optimization functions may be utilized for other desired objectives.

It will be apparent that, under some circumstances related to the specifics of the business policies and objectives, these formulated optimization problems may be solved at step 620 algebraically using closed form to produce a set of substantially optimal prices, each price corresponding to a product/customer segment.

Alternatively, at step 630, these optimization problems may be formulated as a non-linear program (for example, a mixed integer program) for consumption by an optimization engine and numerically solved by such an optimization engine at step 640. Creating configuration files for consumption by an optimization engine may include including expressing the objective(s), (which may differ according to product hierarchy or customer segment values) and expressing any cross-product or cross-segment business policies 28, as constraints. The optimization engine executes the optimization problem and returns optimal prices for each of the product/segment combinations for which reliable elasticity could be determined 662.

After substantially optimal prices for each product/customer segment for which reliable demand elasticities could be determined, post-processing may occur. During this post-processing these pricing recommendations may be fine tuned (for example, based on product attributes or business rules) and substantially optimal prices for product/customer segments without reliable elasticity estimates determined, where these substantially optimal price determinations may be based on attributes of a product (for example, growth index, negotiation index, velocity, and exclusivity) or a customer segment.

Figure 6:
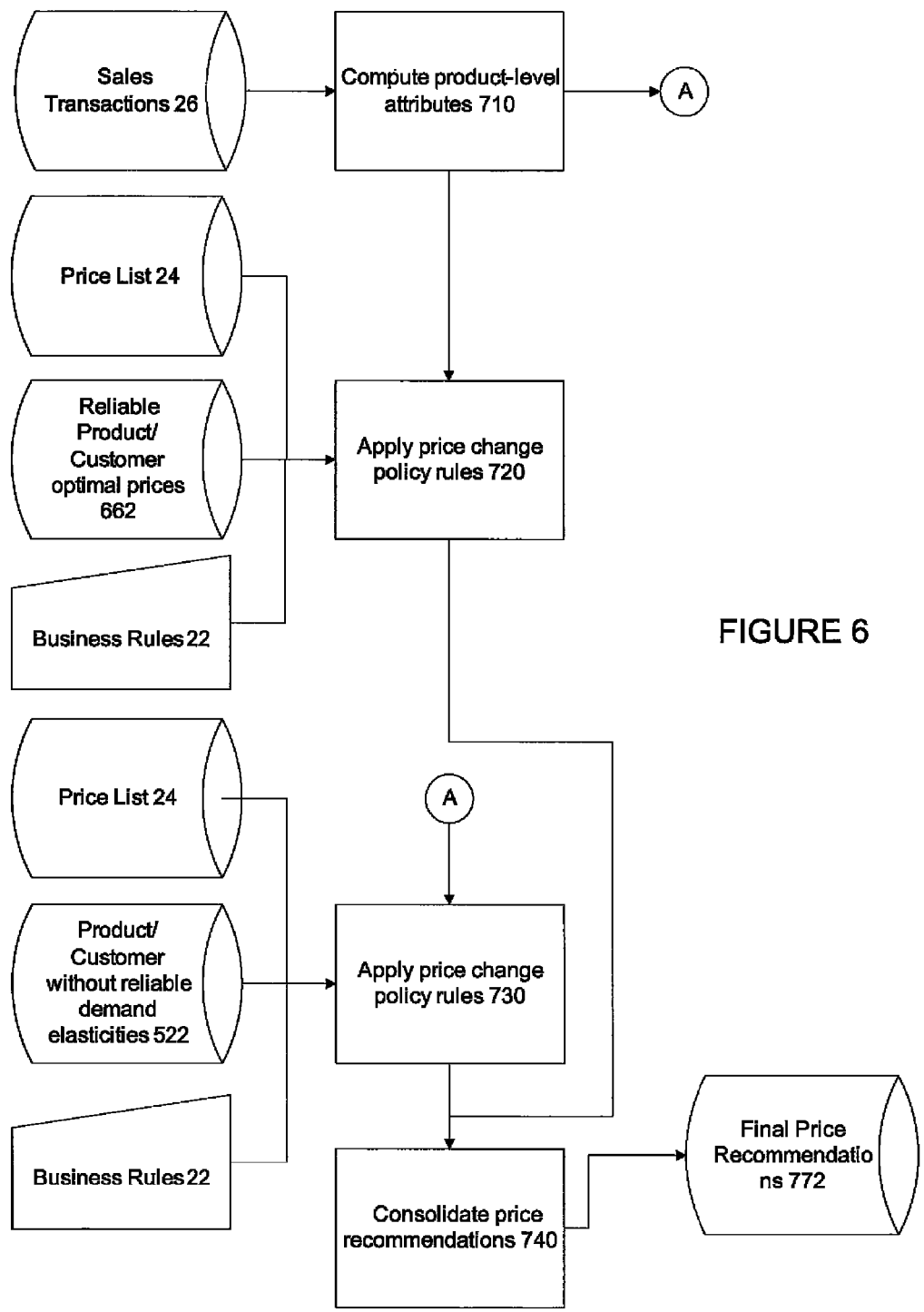
FIG. 6 is a flow diagram of one embodiment of a method for post-processing.

FIG. 6 depicts a flow diagram for one embodiment of a method for post-processing. At step 710 using transaction data 26 one or more product level attributes may be calculated. Examples of such product level attributes may be (it will be apparent that other product level attributes may utilized and calculated as desired):

a. Product Velocity Percentile: Based on total number of transactions for each product in the historical horizon, product velocity percentile is the percentile of the distribution of transaction counts by product.

b. Growth index: First, the quarter over quarter (transaction count) growth percent is calculated for each product and for each of the last 3 quarters. Then the growth_index is the average growth percentage points for the last 3 quarters.

c. Negotiation index: The negotiation index of a product is calculated as the percentile of the distribution of negotiated transaction counts across the category of the product.

d. Exclusive products: these products may be identified by a user, in the price list or elsewhere.

Utilizing these product level attributes, the initial price list 24 and each of the product/customer segments for which reliable elasticity could be determined 662, a set of business rules 22 may applied at step 720 to adjust the optimal pricing recommendations for the product/customer segments with unreliable elasticities 622. For example:

if the growth_index is less than −5(%), reduce the magnitude of a price increase by $$\exp\left[\frac{5 + \text{growth}_{index}}{20}\right].$$

if the negotiation index is high, reduce the magnitude of a price increase by $$\exp\left[\frac{50 - \text{negotiation}_{index}}{15}\right].$$

if it is an exclusive product, increase the magnitude of a price increase by 3 times and reduce the magnitude of a price decrease by 5 times.

Additionally, any bounds on price changes expressed in the business rules 22 may be accounted for. For example:

Lower bounds on price change. −2%, across all SKUs, not adjusted for product velocity;

Upper bounds on price change. Global bound: +1.5%, further adjusted by product velocity, as $$\Delta_{UB,Global}(= 0.015) * \exp\left(\frac{-\text{product's\_velocity\_percentile} - 50}{100}\right);$$

Final scaling—exponential scaling may be used to scale the increases that are in the range [0.005, inc_max] down to [0.005, 0.015] and the decreases that are in [dec_min, −0.005] to [−0.02, −0.005].

Additionally, at step 730 utilizing these product level attributes, the current prices for the list of current prices corresponding to each product/segment combination, for which reliable elasticities could not be determined 522 may have corresponding prices determined for them using one or more business rules 22 pertaining to price setting. These price setting policy rules may be ordered and define how to set prices, such that a higher ordered price setting rule may be used to determine a price for a product/customer segment if there are multiple business rules that conflict for a particular product/customer segment. Specifically, these rules may be applied based upon product attributes calculated for the product of the product/customer segment. Examples of such rules are as follows (it will be apparent that other rules may be utilized as desired):

| Condition | Action |
|---|---|
| WHEN it is an exclusive SKU AND Negotiation Index = 0 | set price to the maximum allowable price |
| WHEN it is an exclusive SKU AND Growth Index > 10 | set price to the maximum allowable price |
| WHEN it is NOT an exclusive SKU AND Negotiation Index = 0 | set price to the maximum allowable price |
| WHEN it is NOT an exclusive SKU AND Growth Index > 10 (= qtr over qtr average growth based on qty > 10%) | Increase price by the half of the maximum allowable price increase for that SKU-segment |
| WHEN it is NOT an exclusive SKU AND Negotiation Index > 50 (= median negotiation index of the category) | set price to the minimum allowable price for that SKU-segment |
| WHEN it is NOT an exclusive SKU AND Growth Index < −10 (= qtr over qtr average decay based on qty < −10%) | set price to the minimum allowable price for that SKU-segment |

Once pricing recommendations have been determined for both product/customer segments for which reliable elasticities could be determined and those product/customer segments for which reliable elasticities could not be determined these pricing recommendations may be consolidated at step 740 to produce a set of final pricing recommendations comprising recommendations for all product and customer segment combinations. These final pricing recommendations 772 may be output in a variety of formats, communicated to an operator through interface 50, produced as a file for consumption by third party software (for example, ERP software), etc.

These final pricing recommendations 722 may be used to determine a set of impact metrics. More specifically, these impact metrics may allow a business to determine the expected financial impacts (for example, changes in revenue, gross profit, gross margin percentage, etc.) based upon the implementation of the final set of pricing recommendations. In particular, the demand models determined with respect to the product/customer segment may be used to determine such impact metrics.

Figure 7:
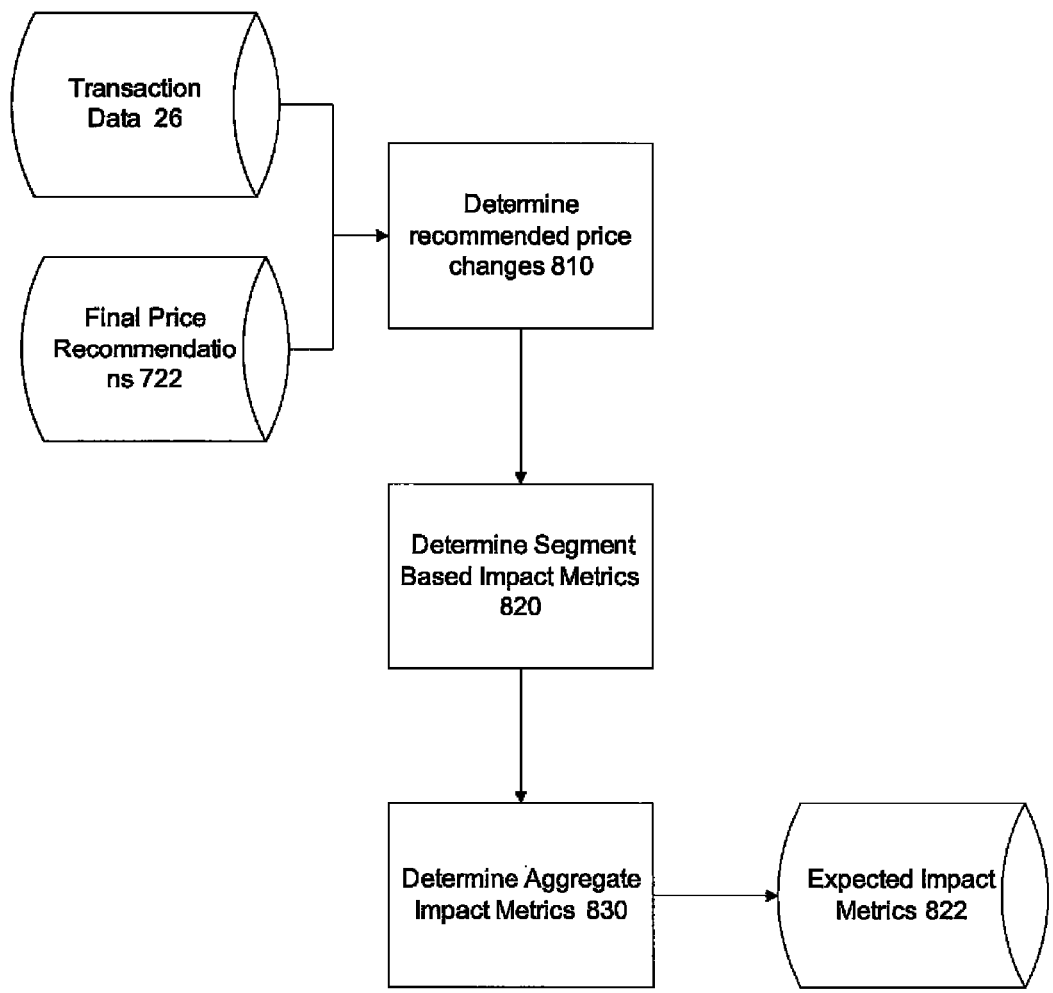
FIG. 7 is a flow diagram of one embodiment of a method for determining impact metrics.

FIG. 7 depicts a flow diagram for one embodiment of determining a set of impact metrics. Using transaction data 26 and the set of final price recommendation 722, recommended price changes may be computed at step 810. In particular, a business may specify the time period over which recommended prices are to be effective (for example, through an operator at interface 50). Then, using transaction data 26 corresponding to approximately this specified time period, for each product/customer segment the price change and one or more financial metrics (for example, average quantity, revenue, gross profit, etc.) can be computed over the specified time period using data (for example, actual prices) associated with transactions corresponding to that product/customer segment and the recommended price determined for that product/customer segment.

Additionally, at step 820 expected changes in sales volume, revenue and profit may also be determined. In one embodiment, this may entail for every product/customer segment under consideration, an expected quantity to be calculated using a price elasticity determined for that product/customer segment, and the recommended price change (for example, assuming cost does not change, using the linearized model for that product/customer segment, as discussed above):

$$q = \max\left(1 + \beta \cdot \left(\frac{p_{curr} - p}{p_{curr}}\right), 0\right) \cdot q_{curr}$$

Based on the expected quantity, and the recommended price determined for that product/customer segment, expected values for other financial metrics (for example, expected revenue, and expected gross profit) for one or more product/customer segments may be computed. Using the impact metrics calculated for each of the product/segment combinations, aggregate impact metrics corresponding to each product over all segments or all products over all segments may be calculated at step 830 by aggregating the product/customer segment expected values of the financial metrics to the desired level. The expected change from the previous time period may be obtained by comparing the result against the corresponding calculated actual impact metric values. One or more these expected impact metrics may then be presented to a user, for example through interface 50).

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, it should be understood that while the invention has been described specifically with respect to price optimization, the method described herein can be, for example, applied to any business process requiring inferences about market response to be made from historical data.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A computer-implemented method for computing, storing and displaying pricing recommendations optimized according to business management objectives under conditions of sparse and unreliable data, the method implemented by instructions executed by a computer, comprising the steps of:

inputting and storing in memory sales transaction data for one or more products, product price lists, product and customer segmentation specifications, business policies and business rules;

preparing the sales transaction data by assembling, organizing, segmenting products and customers according to attributes, filtering and normalizing prices to generate decision variables;

using weighted linear regression algorithms and the prepared sales transaction data, determining sets of demand models, demand model parameters and associated price elasticities corresponding to sets of products, product segments, customer and customer segments;

computing a set of reliability weights for each demand model parameter and associated price elasticity for the set of products and product segments to determine a single reliability flag for each product in the set of products for indication of price elasticity estimates deemed reliable and price elasticity estimates deemed not reliable;

combining the demand model parameters for product segments and demand model parameters for customer segments to form product/customer segment-level demand model parameters, including price elasticities that are deemed reliable and price elasticities that are deemed not reliable;

using closed form algebraic programs and mixed integer non-linear programs in the computer, optimizing price recommendation values according to designated business management objectives, business policies, business rules and price elasticities that are deemed reliable and not reliable, and determining a set of pricing recommendations for a specified set of product/customer segments that are deemed reliable and a specified set of product/customer segments that are deemed not reliable; and wherein the step of computing a set of reliability weights further comprises calculating a set of reliability weights for each demand model based on the product of a computed R-squared regression statistic, a number of distinct decision variable values and a standard deviation of a decision value distribution, and applying hierarchical shrinkage to determine a single reliability flag for each product for indication of price elasticity estimates that are deemed reliable and not reliable.

2. A computer-implemented method for computing, storing and displaying pricing recommendations optimized according to business management objectives under conditions of sparse and unreliable data, the method implemented by instructions executed by a computer, comprising the steps of:

inputting and storing in memory sales transaction data for one or more products, product price lists, product and customer segmentation specifications, business policies and business rules;

preparing the sales transaction data by assembling, organizing, segmenting products and customers according to attributes, filtering and normalizing prices to generate decision variables;

using weighted linear regression algorithms and the prepared sales transaction data, determining sets of demand models, demand model parameters and associated price elasticities corresponding to sets of products, product segments, customer and customer segments;

computing a set of reliability weights for each demand model parameter and associated price elasticity for the set of products and product segments to determine a single reliability flag for each product in the set of products for indication of price elasticity estimates deemed reliable and price elasticity estimates deemed not reliable;

combining the demand model parameters for product segments and demand model parameters for customer segments to form product/customer segment-level demand model parameters, including price elasticities that are deemed reliable and price elasticities that are deemed not reliable;

using closed form algebraic programs and mixed integer non-linear programs in the computer, optimizing price recommendation values according to designated business management objectives, business policies, business rules and price elasticities that are deemed reliable and not reliable, and determining a set of pricing recommendations for a specified set of product/customer segments that are deemed reliable and a specified set of product/customer segments that are deemed not reliable;

wherein the step of computing a set of reliability weights further comprises calculating a set of reliability weights for each demand model based on the product of a computed R-squared regression statistic, a number of distinct decision variable values and a standard deviation of a decision value distribution, and applying hierarchical shrinkage to determine a single reliability flag for each product for indication of price elasticity estimates that are deemed reliable and not reliable; and further comprising setting a reliable flag for each set of reliability weights that exceeds a threshold.

3. A non-transitory computer-readable storage medium with an executable instructions stored thereon, wherein the instructions controls a computer to perform a computer-implemented method for computing, storing and displaying pricing recommendations optimized according to business management objectives under conditions of sparse and unreliable data, comprising the steps of:

inputting and storing in memory sales transaction data for one or more products, product price lists, product and customer segmentation specifications, business policies and business rules;

preparing the sales transaction data by assembling, organizing, segmenting products and customers according to attributes, filtering and normalizing prices to generate decision variables;

using weighted linear regression algorithms and the prepared sales transaction data, determining sets of demand models, demand model parameters and associated price elasticities corresponding to sets of products, product segments, customer and customer segments;

computing a set of reliability weights for each demand model parameter and associated price elasticity for a set of products and product segments to determine a single reliability flag for each product in the set of products for indication of price elasticity estimates deemed reliable and price elasticity estimates deemed not reliable;

combining the demand model parameters for product segments and demand model parameters for customer segments to form product/customer segment-level demand model parameters, including price elasticities that are deemed reliable and price elasticities that are deemed not reliable;

using closed form algebraic programs and mixed integer non-linear programs in the computer, optimizing price recommendation values according to designated business management objectives, business policies, business rules and price elasticities that are deemed reliable and not reliable, and determining a set of pricing recommendations for a specified set of product/customer segments that are deemed reliable and a specified set of product/customer segments that are deemed not reliable; and wherein the step of computing a set of reliability weights further comprises calculating a set of reliability weights for each demand model based on the product of a computed R-squared regression statistic, a number of distinct decision variable values and a standard deviation of a decision value distribution, and applying hierarchical shrinkage to determine a single reliability flag for each product for indication of price elasticity estimates that are deemed reliable and not reliable.

4. A non-transitory computer-readable storage medium with an executable instructions stored thereon, wherein the instructions controls a computer to perform a computer-implemented method for computing, storing and displaying pricing recommendations optimized according to business management objectives under conditions of sparse and unreliable data, comprising the steps of:

inputting and storing in memory sales transaction data for one or more products, product price lists, product and customer segmentation specifications, business policies and business rules;

preparing the sales transaction data by assembling, organizing, segmenting products and customers according to attributes, filtering and normalizing prices to generate decision variables;

using weighted linear regression algorithms and the prepared sales transaction data, determining sets of demand models, demand model parameters and associated price elasticities corresponding to sets of products, product segments, customer and customer segments;

computing a set of reliability weights for each demand model parameter and associated price elasticity for a set of products and product segments to determine a single reliability flag for each product in the set of products for indication of price elasticity estimates deemed reliable and price elasticity estimates deemed not reliable;

combining the demand model parameters for product segments and demand model parameters for customer segments to form product/customer segment-level demand model parameters, including price elasticities that are deemed reliable and price elasticities that are deemed not reliable;

using closed form algebraic programs and mixed integer non-linear programs in the computer, optimizing price recommendation values according to designated business management objectives, business policies, business rules and price elasticities that are deemed reliable and not reliable, and determining a set of pricing recommendations for a specified set of product/customer segments that are deemed reliable and a specified set of product/customer segments that are deemed not reliable;

wherein the step of computing a set of reliability weights further comprises calculating a set of reliability weights for each demand model based on the product of a computed R-squared regression statistic, a number of distinct decision variable values and a standard deviation of a decision value distribution, and applying hierarchical shrinkage to determine a single reliability flag for each product for indication of price elasticity estimates that are deemed reliable and not reliable; and further comprising setting a reliable flag for each set of reliability weights that exceeds a threshold.

* * * * *